United States Patent

Ichiyanagi

(10) Patent No.: US 10,974,703 B2
(45) Date of Patent: Apr. 13, 2021

(54) ASSEMBLY OF DASH PANEL AND BRAKE MASTER CYLINDER UNIT

(71) Applicants: TOYOTA JIDOSHA KABUSHIKI KAISHA, Aichi (JP); SUBARU CORPORATION, Tokyo (JP)

(72) Inventor: Tetsuya Ichiyanagi, Nagoya (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/999,068

(22) Filed: Aug. 21, 2020

(65) Prior Publication Data

US 2021/0053536 A1 Feb. 25, 2021

(30) Foreign Application Priority Data

Aug. 22, 2019 (JP) .............................. JP2019-152297

(51) Int. Cl.
*B60T 7/06* (2006.01)
*B60T 13/74* (2006.01)
*B60T 13/16* (2006.01)

(52) U.S. Cl.
CPC .............. *B60T 7/06* (2013.01); *B60T 13/161* (2013.01); *B60T 13/745* (2013.01)

(58) Field of Classification Search
CPC .................................................. B60T 13/161
See application file for complete search history.

(56) References Cited

U.S. PATENT DOCUMENTS

2013/0192222 A1 8/2013 Nomura et al.
2015/0274142 A1* 10/2015 Ishizuki .................... B60T 7/06
188/152

FOREIGN PATENT DOCUMENTS

| JP | 2013154842 A | 8/2013 |
| JP | 2018192874 A | 12/2018 |
| KR | 101142307 B1 * | 5/2012 |
| WO | 2014034159 A1 | 3/2014 |

* cited by examiner

*Primary Examiner* — Vicky A Johnson
(74) *Attorney, Agent, or Firm* — Hauptman Ham, LLP

(57) ABSTRACT

An assembly of a dash panel and a brake master cylinder unit of a vehicle disclosed herein may include: a panel-side support plate arranged between the brake master cylinder unit and the dash panel, the panel-side support plate being parallelly fixed to the dash panel; a unit-side support plate arranged between the dash panel and the panel-side support plate, the unit-side support plate being fixed to the brake master cylinder unit; a first anti-vibration plate interposed between the dash panel and the unit-side support plate; a second anti-vibration plate interposed between the unit-side support plate and the panel-side support plate; and a third anti-vibration plate interposed between the panel-side support plate and the brake master cylinder unit. A rigidity of the second anti-vibration plate in a plate thickness direction may be greater than any of rigidities of the first and the third anti-vibration plates in plate thickness directions.

4 Claims, 6 Drawing Sheets

ASSEMBLY OF DASH PANEL AND BRAKE MASTER CYLINDER UNIT

CROSS-REFERENCE

This application claims priority to Japanese Patent Application No. 2019-152297, filed on Aug. 22, 2019, the entire contents of which are incorporated herein by reference.

TECHNICAL FIELD

The technique herein disclosed relates to an assembly of a dash panel and a brake master cylinder unit, the brake master cylinder unit including an electric motor configured to increase an oil pressure depending on a pressing force on a brake pedal.

BACKGROUND

A brake master cylinder unit of an electric vehicle may adopt an electric motor which increases an oil pressure depending on a pressing force on a brake pedal. Such a brake master cylinder unit, which includes an electric motor, is therefore heavier than a conventional brake master cylinder unit. The brake master cylinder unit is supported by a dash panel of a vehicle. The dash panel is a plate serving as a partition between a vehicle cabin and a front compartment. The heavy brake master cylinder unit could greatly vibrate the dash panel while the vehicle is running. Vibration of the dash panel may make a passenger feel uncomfortable.

Japanese Patent Application Publication No. 2013-154842 describes a technique that suppresses vibration and noise of a brake master cylinder unit. According to the technique in Japanese Patent Application Publication No. 2013-154842, a center of gravity of the brake master cylinder unit is positioned closer to the dash panel, so that vibration and noise are reduced. An assembly of a dash panel and a brake master cylinder unit is also shown in each of Japanese Patent Application Publication No. 2018-192874 and International Publication No. WO 2014/034159. For simplicity of description, a brake master cylinder unit may hereinafter be termed simply a cylinder unit.

SUMMARY

One possible measure to suppress vibration transferred from a cylinder unit to a dash panel is to interpose anti-vibration plate(s) between the cylinder unit and the dash panel. Interposing anti-vibration plate(s) having a low rigidity (softer anti-vibration plate(s)) can effectively suppress vibration of the heavy cylinder unit.

In the meantime, a brake pedal is connected to the cylinder unit via a push rod. If the cylinder unit is supported by the dash panel through the anti-vibration plate having a low rigidity, the cylinder unit may move when a driver presses the brake pedal. If the cylinder unit moves when the brake pedal is pressed, the braking force may change, and then, the driver could feel uncomfortable. Thus, a technique configured to achieve both of suppression in vibration of a cylinder unit and securement of a great rigidity against a pressing force on a brake pedal is desired.

The present application discloses an assembly of a dash panel and a cylinder unit (brake master cylinder unit) of a vehicle. The brake master cylinder unit may comprise an electric motor configured to increase an oil pressure depending on a pressing force on a brake pedal, and the brake master cylinder unit is arranged in front of the dash panel and connected to the brake pedal with a push rod. The assembly comprises: a panel-side support plate arranged between the brake master cylinder unit and the dash panel, the panel-side support plate being parallelly fixed to the dash panel; a unit-side support plate arranged between the dash panel and the panel-side support plate, the unit-side support plate being fixed to the brake master cylinder unit; a first anti-vibration plate interposed between the dash panel and the unit-side support plate; a second anti-vibration plate interposed between the unit-side support plate and the panel-side support plate; and a third anti-vibration plate interposed between the panel-side support plate and the brake master cylinder unit. In other words, the dash panel, the first anti-vibration plate, the unit-side support plate, the second anti-vibration plate, the panel-side support plate, the third anti-vibration plate, and the cylinder unit are arranged in this order from rear to front of the vehicle. Further, a rigidity of the second anti-vibration plate in a plate thickness direction is greater than any of rigidities of the first and the third anti-vibration plates in plate thickness directions.

The "front" and the "rear" respectively mean "front" and "rear" of the vehicle to which the assembly is built in.

The pressing force on the brake pedal is transferred to the cylinder unit through the push rod. The pressing force pushes the cylinder unit and the unit-side support plate forward. The second anti-vibration plate is in contact with a front side of the unit-side support plate, and the panel-side support plate is in contact with a front side of the second anti-vibration plate. The panel-side support plate is fixed to the dash panel. The second anti-vibration plate has a great rigidity, and thus it is hardly decreased in thickness under the pressing force on the brake pedal. The unit-side support plate (the cylinder unit) that has received the pressing force is therefore supported securely by the panel-side support plate which is fixed to the dash panel. In other words, the cylinder unit does not move when the brake pedal is pressed.

The first anti-vibration plate having a low rigidity is in contact with a rear side of the unit-side support plate, which is fixed to the cylinder unit, and the third anti-vibration plate having a low rigidity is in contact with a rear side of the cylinder unit. The first anti-vibration plate (as well as the third anti-vibration plate), which is in contact with the rear side of the unit-side support plate (as well as the cylinder unit), does not interfere with the pressing force on the brake pedal. Moreover, vibration of the electric motor has a frequency considerably higher than a frequency band of the pressing force on the brake pedal. The high-frequency vibration is absorbed by the first anti-vibration plate which is in contact with the unit-side support plate and by the third anti-vibration plate which is in contact with the cylinder unit. As such, the assembly of the dash panel and the cylinder unit disclosed herein can achieve both the suppression in vibration of the cylinder unit and the ensuring of a great rigidity against the pressing force on the brake pedal.

One aspect of the present disclosure may be realized as follows. Another assembly may comprise: a panel-side support plate arranged behind the brake master cylinder unit and the dash panel, the panel-side support plate being parallelly fixed to the dash panel; a unit-side support plate arranged between the dash panel and the panel-side support plate, the unit-side support plate being fixed to the brake master cylinder unit; a first anti-vibration plate interposed between the panel-side support plate and the unit-side support plate; a second anti-vibration plate interposed between the unit-side support plate and the dash panel; and a third anti-vibration plate interposed between the dash panel and the brake master cylinder unit. In other words, the panel-side support plate, the first anti-vibration plate, the unit-side support plate, the second anti-vibration plate, the dash panel, the third anti-vibration plate, and the cylinder unit are arranged in this order from rear to front of the vehicle. Further, a rigidity of the second anti-vibration plate in a plate thickness direction is greater than any of rigidities of the first and the third anti-vibration plates in plate thickness directions.

The above-described assembly also allows the pressing force on the brake pedal to be transferred to the cylinder unit, the unit-side support plate, the second anti-vibration plate which is in contact with the front side of the unit-side support plate, and the dash panel which is in contact with the front side of the second anti-vibration plate. In other words, the pressing force on the brake pedal is securely received by the dash panel through the second anti-vibration plate which has a great rigidity. The great rigidity is ensured against the pressing force.

The first anti-vibration plate having a low rigidity is in contact with the rear side of the unit-side support plate, and the third anti-vibration plate having a low rigidity is in contact with the rear side of the cylinder unit. The first and the third anti-vibration plates therefore do not interfere with the pressing force on the brake pedal. In the meantime, vibration of the electric motor that has the frequency considerably higher than the frequency band of the pressing force is absorbed by the first and the third anti-vibration plates, each of which has a low rigidity.

Details and further improvements of the technique disclosed herein will be described in Detailed Description below.

BRIEF DESCRIPTION OF DRAWINGS

DETAILED DESCRIPTION (First Embodiment) With reference to drawings, an assembly 1 in a first embodiment will be described. The first embodiment is an assembly of a dash panel and a cylinder unit 10 (a brake master cylinder unit 10). The cylinder unit 10 is supported by the dash panel. The assembly 1 employs a plurality of support plates and a plurality of anti-vibration plates. FIG. 1 shows an exploded view of the plurality of support plates and the plurality of anti-vibration plates. To aid understanding, FIG. 1 does not show the dash panel. "Front", "rear", and the like of a coordinate system in the drawings are designations with respect to the vehicle.

Figure 1:
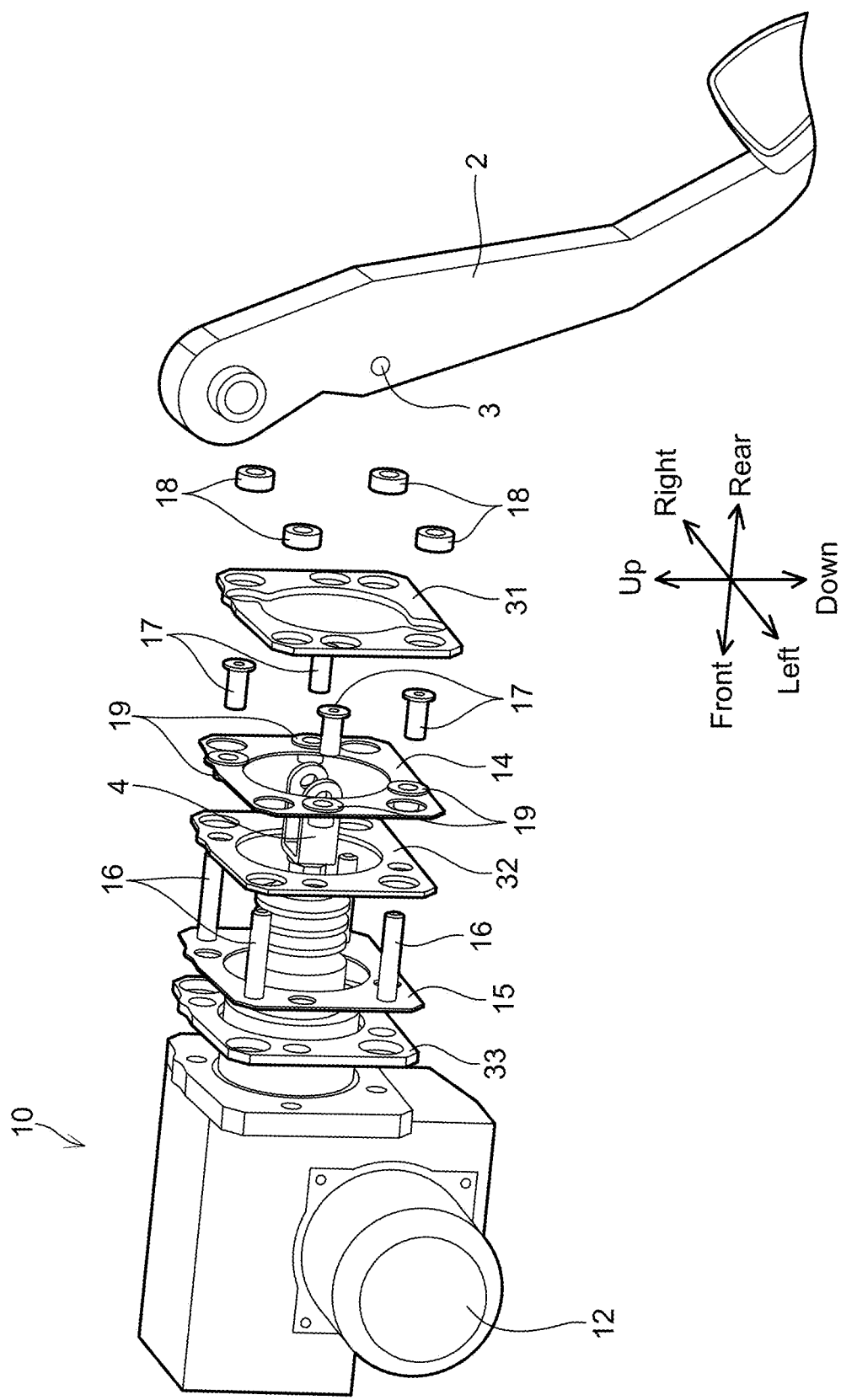
FIG. 1 is an exploded perspective view of a plurality of support plates and a plurality of anti-vibration plates both adopted in an assembly in a first embodiment.

Although not shown in FIG. 1, the dash panel is positioned between a first anti-vibration plate 31 (as well as iron collars 18) and a brake pedal 2. A front surface of the dash panel is in contact with a rear surface of the first anti-vibration plate 31, which will be described in detail later.

The cylinder unit 10 is linked with the brake pedal 2 with a push rod 4. The push rod 4 has a rear end connected to a pivot 3 of the brake pedal 2. The push rod 4 is connected to a hydraulic piston within the cylinder unit 10. When a driver presses the brake pedal 2, the hydraulic piston is pushed via the push rod 4, and an oil pressure inside the brake master cylinder unit 10 increases accordingly. Although not shown, the cylinder unit 10 is connected to a brake actuator by a hydraulic pipe, and when the oil pressure in the cylinder increases, the brake actuator operates to brake wheel(s).

The cylinder unit 10 comprises an electric motor 12. The electric motor 12 is configured to increase the oil pressure in the cylinder depending on a pressing force on the brake pedal 2, although a detailed mechanism thereof will not be described. In other words, the electric motor 12 amplifies the oil pressure outputted by the cylinder unit 10. Owing to the amplification ability of the electric motor 12, a small pressing force produces a great oil pressure output (i.e., braking force).

Meanwhile, the inclusion of the electric motor 12 makes the cylinder unit 10 heavier, thus vibration of the cylinder unit 10 affects the dash panel more greatly. To address this, the cylinder unit 10 is supported by the dash panel via anti-vibration plates. By adopting anti-vibration plates having a low rigidity in a plate thickness direction, the vibration of the cylinder unit 10 can be effectively suppressed. However, if simply interposing of one anti-vibration plate between the cylinder unit 10 and the dash panel, a following problem will be incurred. If a part of the anti-vibration plate which supports the cylinder unit 10 has a low rigidity, the cylinder unit 10 undesirably moves upon a driver pressing the brake pedal. Such movement of the cylinder unit 10 varies a resisting force against the pressing force on the brake pedal. Varying a resisting force may make the driver feel uncomfortable. The assembly 1 described in the embodiment can achieve both of suppression in vibration of the cylinder unit 10 and ensuring of a great rigidity against the pressing force on the brake pedal 2.

Return to the description of the assembly 1 with referring to FIG. 1. The dash panel, which is not shown in FIG. 1, is positioned between the first anti-vibration plate 31 (as well as the iron collars 18) and the brake pedal 2. The first anti-vibration plate 31, a unit-side support plate 14, a second anti-vibration plate 32, a panel-side support plate 15, and a third anti-vibration plate 33 are stacked between the dash panel 20 and the cylinder unit 10 in this order from a rear side to a front side of the vehicle. The unit-side support plate 14 and the panel-side support plate 15 are made of metal (iron). The first to the third anti-vibration plates 31 to 33 are made of anti-vibration rubber. The first to the third anti-vibration plates 31 to 33 are made of, for example, ethylene propylene rubber (Ethylene Propylene Diene Monomer).

Each of the first to the third anti-vibration plates 31 to 33, the unit-side support plate 14, and the panel-side support plate 15 has a large hole at a center, and the push rod 4 passes through these holes. Each of the first to the third anti-vibration plates 31 to 33, the unit-side support plate 14, and the panel-side support plate 15 has a plurality of small holes around the central large hole. Hexagonal low-head bolts 17, stud bolts 16, and/or the like are inserted through these small halls. The hexagonal low-head bolts 17 are accompanied with iron collars 19, and the stud bolts 16 are accompanied with the iron collars 18. A relation among the hexagonal low-head bolts 17, the iron collars 19, the stud bolts 16, and the iron collars 18 will be mentioned later.

Figure 2:
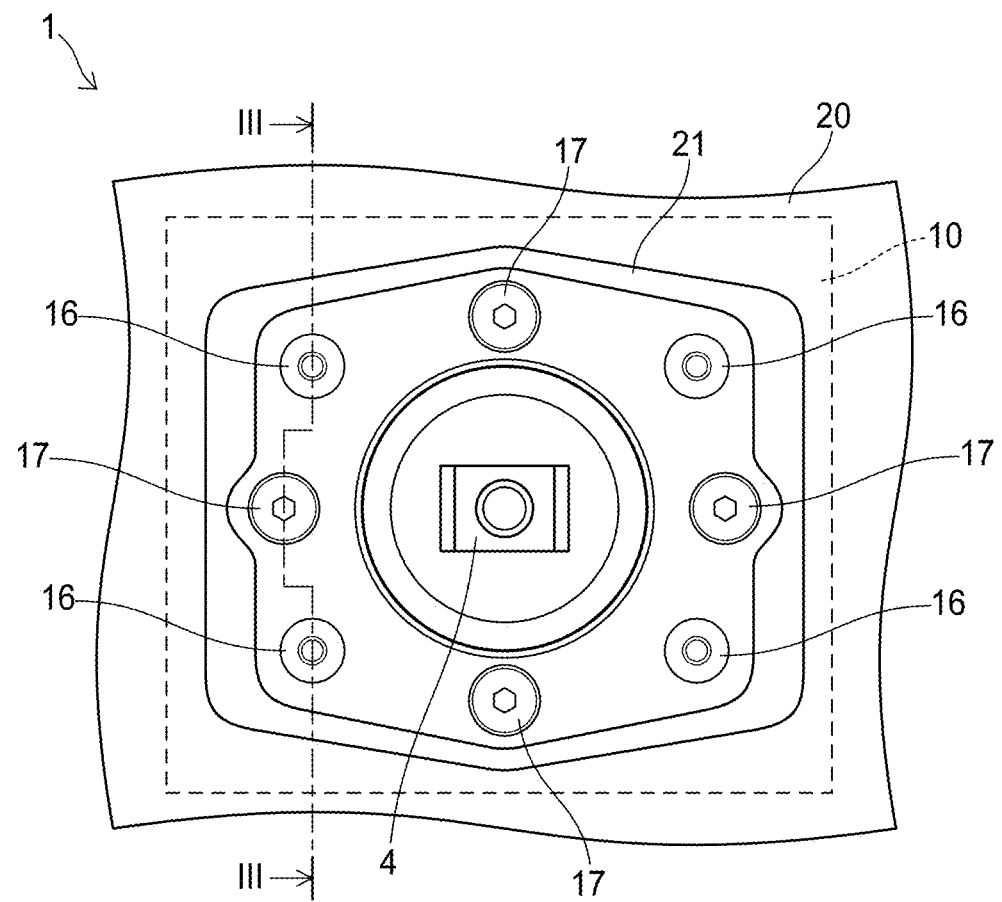
FIG. 2 is a plan view of a cylinder unit as viewed from a cabin side.

FIG. 2 shows a drawing of a dash panel 20 as viewed from a cabin side. FIG. 2 does not show the brake pedal. A spacer 21 is positioned in front of the dash panel 20 in a viewpoint of FIG. 2, and the cylinder unit 10 is fixed to the dash panel 20 through the spacer 21 and/or the like. The aforementioned panel-side support plate 15 (see FIG. 1) is fixed to the dash panel 20 with the four stud bolts 16, and the unit-side support plate 14 (see FIG. 1) is fixed to the cylinder unit 10 with the four hexagonal low-head bolts 17. The push rod 4 is surrounded by a bellows tube on a cylinder unit 10 side, which tube is not shown in FIG. 2 (and in the following drawings).

Figure 3:
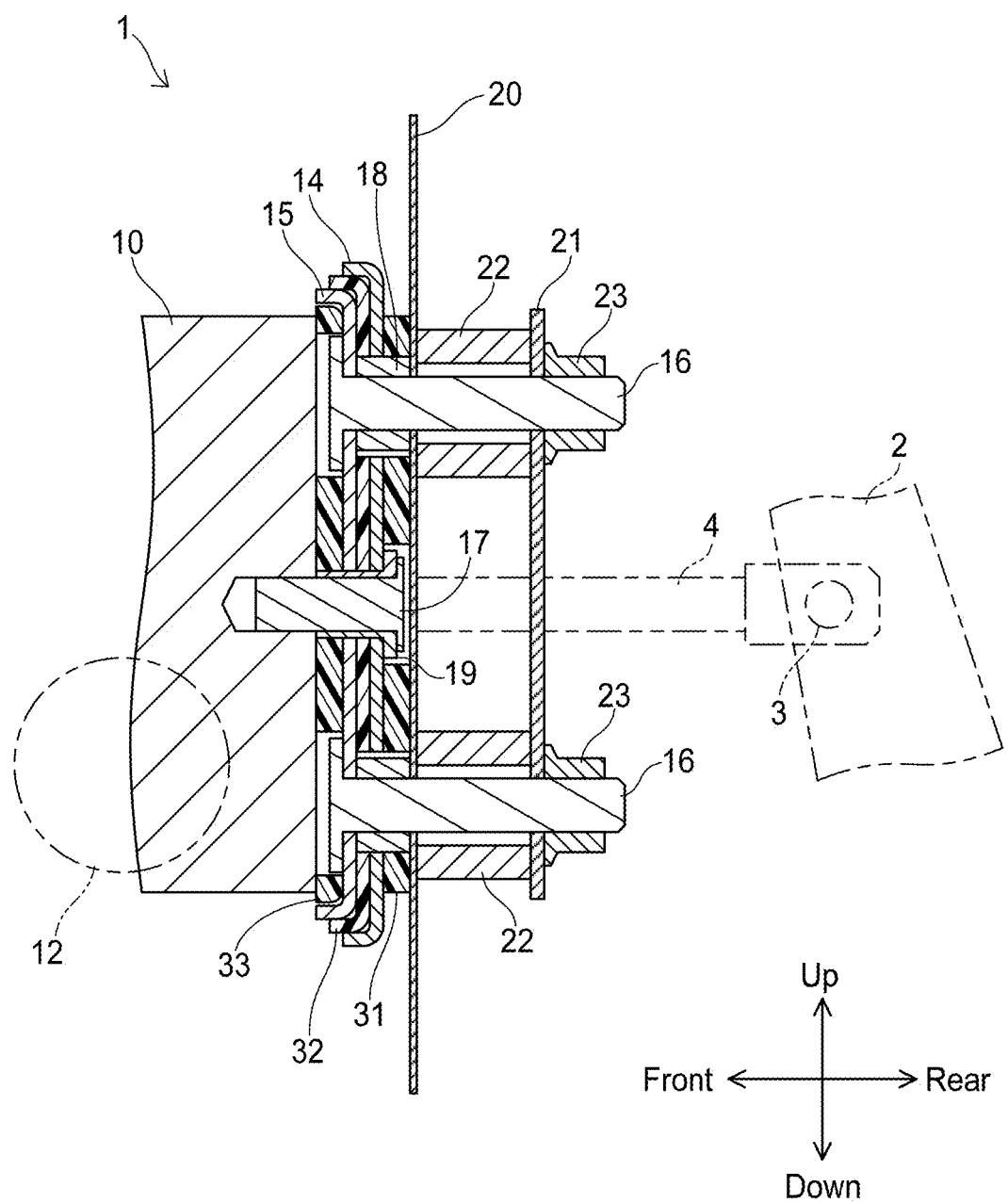
FIG. 3 is a cross-sectional view taken along a line III-III in FIG. 2.

FIG. 3 shows a cross-sectional view taken along a line III-III in FIG. 2. FIG. 3 shows a cross section that crosses the stud bolts 16 and one of the hexagonal low-head bolts 17. FIG. 3 depicts the brake pedal 2, the push rod 4, and the electric motor 12 by phantom lines.

As mentioned before, the first anti-vibration plate 31, the unit-side support plate 14, the second anti-vibration plate 32, the panel-side support plate 15, and the third anti-vibration plate 33 are stacked in this order between the dash panel 20 and the cylinder unit 10 from the rear side to the front side of the vehicle. The stud bolts 16 are welded to the panel-side support plate 15. The panel-side support plate 15 is fixed to the dash panel 20 with the stud bolts 16. The panel-side support plate 15 is positioned parallel to the dash panel 20 between the dash panel 20 and the cylinder unit 10. The stud bolts 16 are inserted through the iron collars 18, and are fixed to the dash panel 20. Behind the dash panel 20, the stud bolts 16 are passed through other iron collars 22. The stud bolts 16 are fixed to the dash panel 20 through the spacer 21 with nuts 23. In other words, the panel-side support plate 15, the iron collars 18, 22, the dash panel 20, and the spacer 21 are clamped from opposing sides with the stud bolts 16 and the nuts 23. All of the panel-side support plate 15, the iron collars 18, 22, the dash panel 20, and the spacer 21 are made of metal (iron). In particular, each of the iron collars 18 has one end being in contact with the dash panel 20, and the other end being in contact with the panel-side support plate 15. Although the first anti-vibration plate 31, the unit-side support plate 14, and the second anti-vibration plate 32 are also interposed between the panel-side support plate 15 and the dash panel 20, a load received by the panel-side support plate 15 is transferred directly to the dash panel 20 through the iron collars 18.

The unit-side support plate 14 is fixed to the cylinder unit 10 with the hexagonal low-head bolts 17. The unit-side support plate 14 is positioned parallel to the dash panel 20 between the panel-side support plate 15 and the dash panel 20. The iron collars 19 are interposed between the cylinder unit 10 and the unit-side support plate 14. Each of the iron collar 19 has one end that is in contact with the unit-side support plate 14 and the other end that is in contact with the cylinder unit 10. Although the second anti-vibration plate 32, the panel-side support plate 15, and the third anti-vibration plate 33 are also interposed between the cylinder unit 10 and the unit-side support plate 14, a load received by the unit-side support plate 14 is transferred directly to the cylinder unit 10 through the iron collars 19.

The brake pedal 2 is connected to the push rod 4 with the pivot 3. As aforementioned, the push rod 4 has one end connected to the cylinder unit 10. When the brake pedal 2 is pressed, a forward force (pressing force) is applied to the cylinder unit 10 through the push rod 4.

Figure 4:
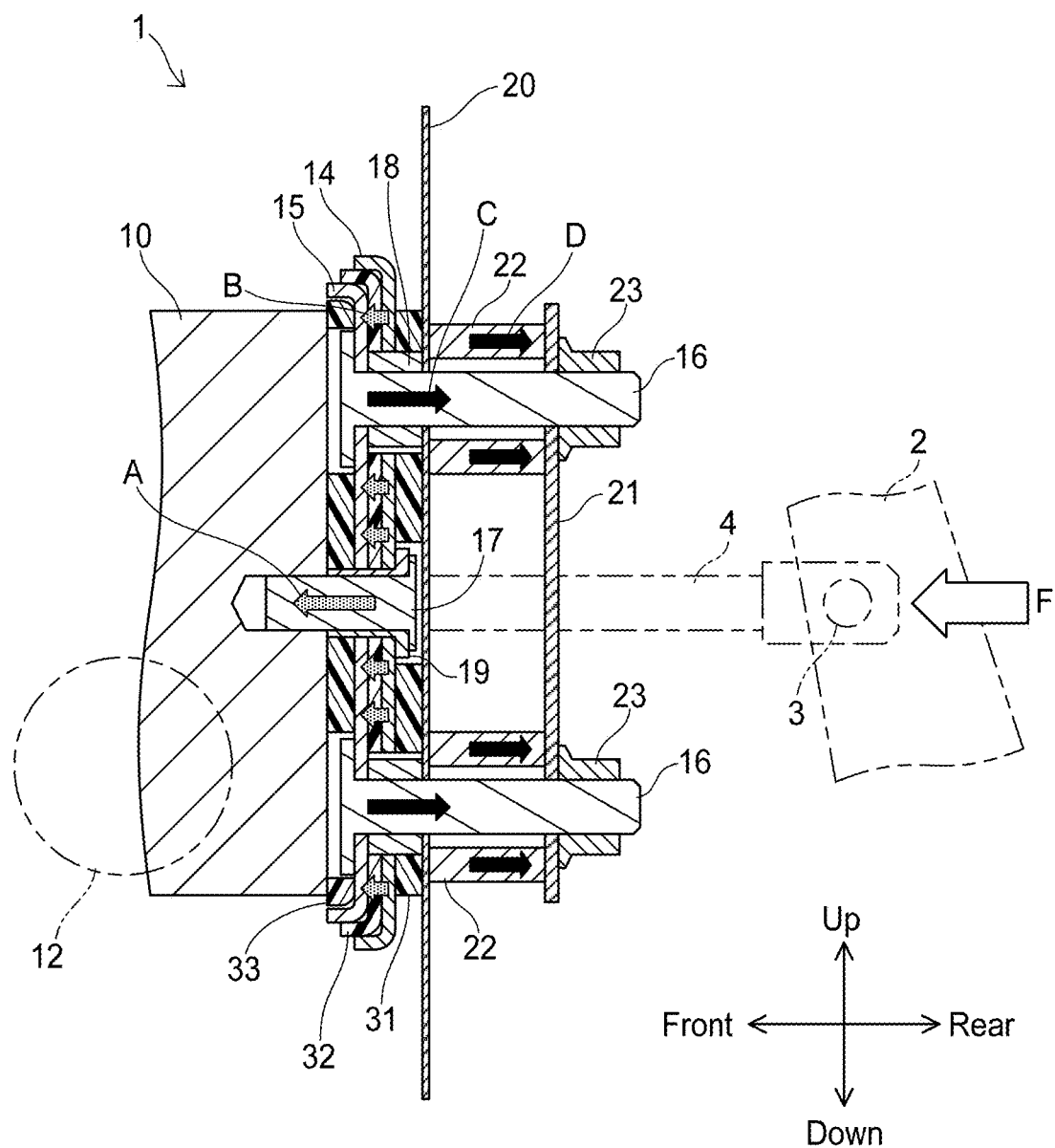
FIG. 4 is a cross-sectional view showing a path along which a pressing force on a brake pedal is transferred.

With reference to FIG. 4, a path along which the pressing force on the brake pedal 2 is transferred to the dash panel 20 will be described. FIG. 4 is the same drawing as FIG. 3, with arrows each indicating a force added thereto. A pressing force F on the brake pedal 2 is transferred to the cylinder unit 10 through the push rod 4. The pressing force F transferred to the cylinder unit 10 is then transferred to the unit-side support plate 14 through the hexagonal low-head bolt 17 and the iron collar 19 (a gray arrow A). This force pushes the unit-side support plate 14 forwards (Rear to Front direction of the vehicle). The second anti-vibration plate 32 is in contact with a front surface of the unit-side support plate 14, and the panel-side support plate 15 is in contact with a front surface of the second anti-vibration plate 32. The pressing force F transferred to the unit-side support plate 14 is then transferred to the panel-side support plate 15 through the second anti-vibration plate 32 (gray arrows B). The panel-side support plate 15 is pushed forward by the pressing force F.

On the other hand, the panel-side support plate 15 is fixed firmly to the dash panel 20 through the stud bolts 16, the iron collars 18, 22, the spacer 21, and the nuts 23. Therefore, although the panel-side support plate 15 is pushed forwards by the pressing force F, the panel-side support plate 15 does not move therefrom, and can securely receive the pressing force F (black arrows C, D). In other words, the pressing force F is securely received by the dash panel 20.

The pressing force F compresses the second anti-vibration plate 32. By having the second anti-vibration plate 32 have a great rigidity in a plate thickness direction, the cylinder unit is supported securely by the dash panel 20 and thus does not move even if the pressing force F is applied thereto. Therefore, the assembly 1 in the embodiment ensures a great rigidity against the pressing force F on the brake pedal 2.

Since the cylinder unit 10 is pushed forwards by the pressing force F, the third anti-vibration plate 33, which is in contact with a rear side of the cylinder unit 10, does not contribute to the transfer of the pressing force F. Similarly, since the unit-side support plate 14 is also pushed forwards by the pressing force F, the first anti-vibration plate 31, which is in contact with a rear surface of the unit-side support plate 14, does not contribute to the transfer of the pressing force F, either.

Figure 5:
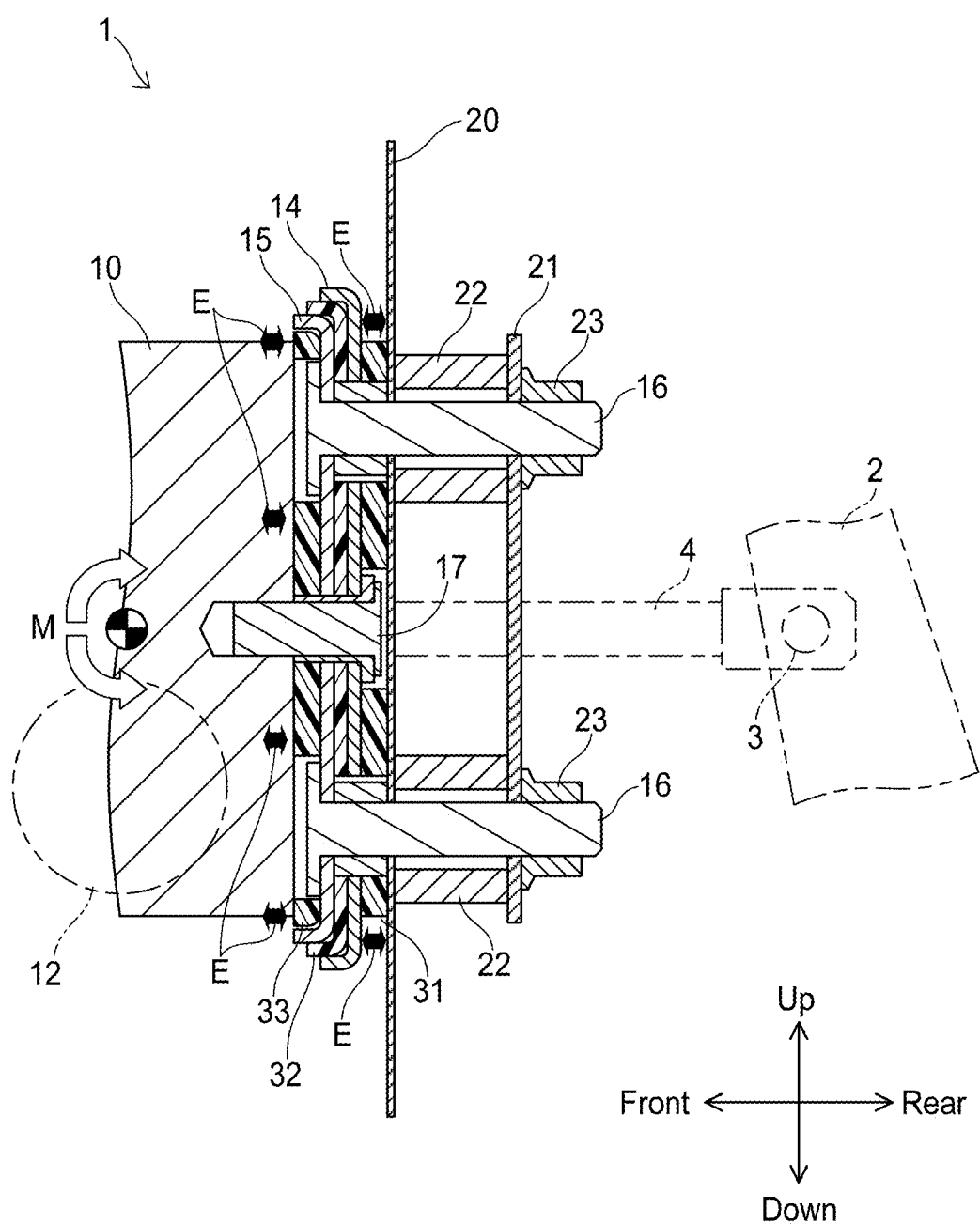
FIG. 5 is a cross-sectional view showing a path along which vibration of an electric motor is transferred.

On the other hand, when the electric motor 12 is operated, the cylinder unit 10 vibrates. With reference to FIG. 5, a path along which vibration of the cylinder unit 10 is transferred will be described. FIG. 5 is a same cross-sectional view as FIG. 3 with arrows indicating paths along which vibration is transferred added thereto. Vibration (a moment M) of the electric motor 12 vibrates the cylinder unit 10. The cylinder unit 10 has the unit-side support plate 14 firmly fixed thereto, and thus the unit-side support plate 14 also vibrates. The third anti-vibration plate 33 is in contact with the cylinder unit 10, and the first anti-vibration plate 31 is in contact with the unit-side support plate 14. Vibration of the cylinder unit 10 is transferred to the first and the third anti-vibration plates 31, 33 (black arrows E). Therefore, by having the first and the third anti-vibration plates 31, 33 have a low rigidity in their respective plate thickness directions, vibration of the cylinder unit 10 can effectively be suppressed. The second anti-vibration plate 32 is also in contact with the unit-side support plate 14. However, even though the second anti-vibration plate 32 has the great rigidity in the plate thickness direction, the first and the third anti-vibration plates 31, 33 having the low rigidity can suppress the vibration of the cylinder unit 10.

The assembly 1 in the first embodiment adopts an anti-vibration plate having a great rigidity in a plate thickness direction as the second anti-vibration plate 32, and adopts anti-vibration plates each having a low rigidity in a plate thickness direction as the first and the third anti-vibration plates 31, 33. In other words, in the assembly 1 in the first embodiment, the rigidity of the second anti-vibration plate 32 in the plate thickness direction is greater than any of the rigidities of the first and the third anti-vibration plates 31, 33 in the plate thickness directions. The above-described structure can achieve both of suppression in vibration of the cylinder unit and ensuring of a great rigidity against the pressing force on the brake pedal 2.

The above-described effects are obtained even without the iron collars 22 and the spacer 21.

Figure 6:
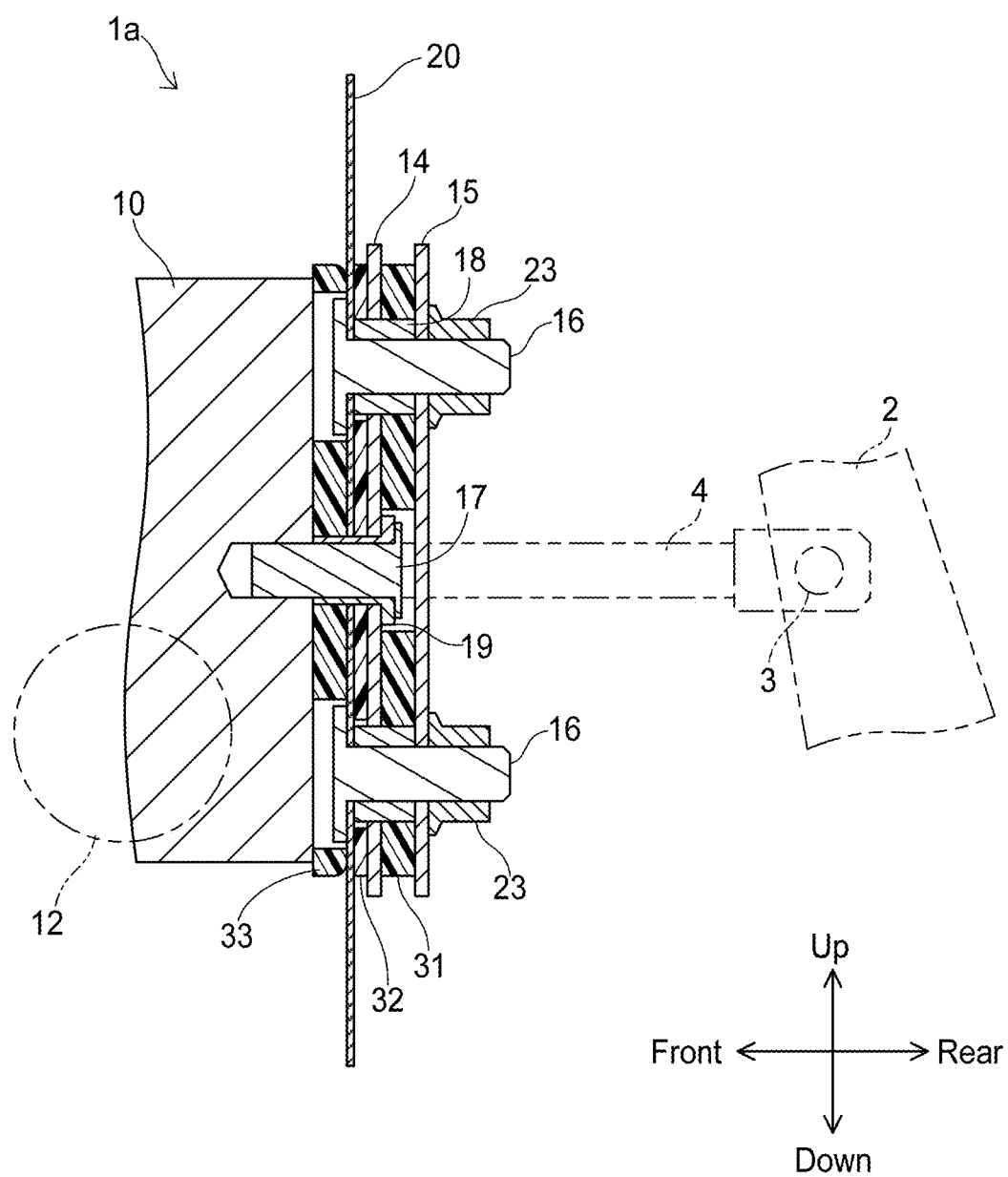
FIG. 6 is a cross-sectional view showing an assembly in a second embodiment.

(Second Embodiment) FIG. 6 shows a cross-sectional view of an assembly 1*a* of a second embodiment. The assembly 1*a* in the second embodiment also comprises first to the third anti-vibration plates, a panel-side support plate 15, and a unit-side support plate 14.

The panel-side support plate 15 is fixed to a dash panel 20 with stud bolts 16. The panel-side support plate 15 is arranged parallel to the dash panel 20 behind the dash panel 20 and a cylinder unit 10. Iron collars 18 are interposed between the dash panel 20 and the panel-side support plate 15, and the panel-side support plate 15 is fixed firmly to the dash panel 20. The panel-side support plate 15 is fixed to the dash panel 20 with the stud bolts 16.

The unit-side support plate 14 is fixed to the cylinder unit 10 with hexagonal low-head bolts 17. The unit-side support plate 14 is arranged parallel to the panel-side support plate 15 between the dash panel 20 and the panel-side support plate 15. Iron collars 19 are interposed between the unit-side support plate 14 and the cylinder unit 10, and the unit-side support plate 14 is fixed firmly to the cylinder unit 10.

A first anti-vibration plate 31 is interposed between the panel-side support plate 15 and the unit-side support plate 14. A second anti-vibration plate 32 is interposed between the unit-side support plate 14 and the dash panel 20. A third anti-vibration plate 33 is interposed between the dash panel 20 and the cylinder unit 10. In other words, the panel-side support plate 15, the first anti-vibration plate 31, the unit-side support plate 14, the second anti-vibration plate 32, the dash panel 20, the third anti-vibration plate 33, and the cylinder unit 10 are stacked in this order from the rear side to the front side of the vehicle. A brake pedal 2, a push rod 4, and an electric motor 12 respectively have same configurations as those in the first embodiment.

A rigidity of the second anti-vibration plate 32 in a plate thickness direction is greater than any of rigidities of the first and the third anti-vibration plates 31, 33 in plate thickness directions. The assembly 1*a* in the second embodiment can also be expected to have the same advantages as those of the first embodiment owing to the same principle as that of the technique described in the first embodiment. In other words, the assembly 1*a* in the second embodiment can also allow for both of suppression in vibration of the cylinder unit 10 and ensuring of a great rigidity against the pressing force on the brake pedal 2.

The assembly 1*a* in the second embodiment can be expected to have the same advantages as those of the assembly 1 in the first embodiment. But compared to the second embodiment, the assembly 1 of the first embodiment allows for easier operation of coupling the cylinder unit 10. In the assembly 1 in the first embodiment, after fixing the first to third anti-vibration plates 31 to 33, the unit-side support plate 14, and the panel-side support plate 15 to the cylinder unit 10, the resultant assembly can be coupled to the dash panel 20.

Points to be noted regarding the technique described in the embodiments will be mentioned. The rigidity of the second anti-vibration plate 32 in the plate thickness direction is greater than any of the rigidities of the first and the third anti-vibration plates 31, 33 in the plate thickness directions. If a same material is implemented for the first to third anti-vibration plates 31 to 33, an anti-vibration plate having a plate thickness smaller than any of plate thicknesses of the first and the third anti-vibration plates 31, 33 may be adopted as the second anti-vibration plate 32. Alternatively, a material harder than any of materials for the first and the third anti-vibration plates 31, 33 may be adopted as the material of the second anti-vibration plate 32.

In the assemblies 1, 1*a* in the embodiments, the unit-side support plate 14 is fixed to the cylinder unit 10 with the hexagonal low-head bolts 17. Alternatively, the unit-side support plate 14 may be fixed to the cylinder unit 10 with screw(s) other than the hexagonal low-head bolt 17. The panel-side support plate 15 is fixed to the dash panel 20 with the stud bolts 16. Alternatively, the panel-side support plate 15 may be fixed to the dash panel 20 with screw(s) other than the stud bolts 16.

(Reference Example) The assemblies 1, 1*a* in the embodiments each adopt the three anti-vibration plates such that the cylinder unit 10 (and the unit-side support plate 14) and the dash panel 20 (and the panel-side support plate 15) are not in direct contact with each other but are coupled via the anti-vibration plates. If the cylinder unit 10 (and the unit-side support plate 14) and the dash panel 20 (and the panel-side support plate 15) are allowed to be partially in direct contact with each other, following configurations can also achieve both of the suppression in vibration of the cylinder unit 10 and the ensuring of the great rigidity against the pressing force on the brake pedal, although effects brought by these configurations are smaller than those by the configurations in embodiments 1, 1a.

An assembly in a first reference has the structure in the first embodiment with the third anti-vibration plate 33 excluded. In other words, the panel-side support plate 15 is arranged between the cylinder unit 10 and the dash panel 20, and is parallelly fixed to the dash panel 20. The unit-side support plate 14 is arranged between the dash panel 20 and the panel-side support plate 15, and is fixed to the cylinder unit 10. The first anti-vibration plate 31 is interposed between the dash panel 20 and the unit-side support plate 14. The second anti-vibration plate 32 is interposed between the unit-side support plate 14 and the panel-side support plate 15. The rigidity of the second anti-vibration plate 32 in the plate thickness direction is greater than the rigidity of the first anti-vibration plate 31 in the plate thickness direction. In the case of this configuration, although the panel-side support plate 15 is in direct contact with the cylinder unit 10, the first anti-vibration plate 31 suppresses vibration of the cylinder unit 10.

An assembly in a second reference has the structure in the first embodiment with the first anti-vibration plate 31 excluded. In other words, the panel-side support plate 15 is arranged between the cylinder unit 10 and the dash panel 20, and is parallelly fixed to the dash panel 20. The unit-side support plate 14 is arranged between the dash panel 20 and the panel-side support plate 15, and is fixed to the cylinder unit 10. An anti-vibration plate (the second anti-vibration plate 32 in the embodiment) is interposed between the unit-side support plate 14 and the panel-side support plate 15. Another anti-vibration plate (the third anti-vibration plate 33 in the embodiment) is interposed between the panel-side support plate 15 and the cylinder unit 10. The rigidity of the anti-vibration plate (the second anti-vibration plate 32 in the embodiment) in its plate thickness direction is greater than the rigidity of the other anti-vibration plate (the third anti-vibration plate 33 in the embodiment) in its plate thickness direction. In the case of this configuration, although the unit-side support plate 14 is in direct contact with the dash panel 20, the other anti-vibration plate (the third anti-vibration plate 33 in the embodiment) suppresses vibration of the cylinder unit 10.

For another reference, any one of the first anti-vibration plate 31 and the third anti-vibration plate 33 may be excluded from the assembly 1a in FIG. 6. Further, to increase the rigidity against the pressing force on the brake pedal, the second anti-vibration plate 32 may also be excluded from the structures in the plurality of references described above.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. An assembly of a dash panel and a brake master cylinder unit of a vehicle, wherein the brake master cylinder unit comprises an electric motor configured to increase an oil pressure depending on a pressing force on a brake pedal, and the brake master cylinder unit is arranged in front of the dash panel and connected to the brake pedal with a push rod, the assembly comprising:
    a panel-side support plate arranged between the brake master cylinder unit and the dash panel, the panel-side support plate being parallelly fixed to the dash panel;
    a unit-side support plate arranged between the dash panel and the panel-side support plate, the unit-side support plate being fixed to the brake master cylinder unit;
    a first anti-vibration plate interposed between the dash panel and the unit-side support plate;
    a second anti-vibration plate interposed between the unit-side support plate and the panel-side support plate; and
    a third anti-vibration plate interposed between the panel-side support plate and the brake master cylinder unit,
    wherein a rigidity of the second anti-vibration plate in a plate thickness direction is greater than any of rigidities of the first and the third anti-vibration plates in plate thickness directions.

2. The assembly of claim 1 wherein the first anti-vibration plate, a unit-side support plate, a second anti-vibration plate, a panel-side support plate, and a third anti-vibration plate are stacked between the dash panel and the brake master cylinder unit in this order from a rear side to a front side of the vehicle.

3. An assembly of a dash panel and a brake master cylinder unit of a vehicle, wherein the brake master cylinder unit comprises an electric motor configured to increase an oil pressure depending on a pressing force on a brake pedal, and the brake master cylinder unit is arranged in front of the dash panel and connected to the brake pedal with a push rod, the assembly comprising:
    a panel-side support plate arranged behind the brake master cylinder unit and the dash panel, the panel-side support plate being parallelly fixed to the dash panel;
    a unit-side support plate arranged between the dash panel and the panel-side support plate, the unit-side support plate being fixed to the brake master cylinder unit;
    a first anti-vibration plate interposed between the panel-side support plate and the unit-side support plate;
    a second anti-vibration plate interposed between the unit-side support plate and the dash panel; and
    a third anti-vibration plate interposed between the dash panel and the brake master cylinder unit;
    wherein a rigidity of the second anti-vibration plate in a plate thickness direction is greater than any of rigidities of the first and the third anti-vibration plates in plate thickness directions.

4. The assembly of claim 3 wherein the panel-side support plate, the first anti-vibration plate, the unit-side support plate, the second anti-vibration plate, the dash panel, the third anti-vibration plate, and the brake master cylinder unit are stacked in this order from a rear side to a front side of the vehicle.

* * * * *